(12) United States Patent
Tatsumi

(10) Patent No.: US 8,804,077 B2
(45) Date of Patent: Aug. 12, 2014

(54) LIQUID CRYSTAL DISPLAY DEVICE

(75) Inventor: Hironobu Tatsumi, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 680 days.

(21) Appl. No.: 13/140,924

(22) PCT Filed: Jul. 6, 2009

(86) PCT No.: PCT/JP2009/003124
§ 371 (c)(1),
(2), (4) Date: Jun. 20, 2011

(87) PCT Pub. No.: WO2010/070776
PCT Pub. Date: Jun. 24, 2010

(65) Prior Publication Data
US 2011/0317111 A1   Dec. 29, 2011

(30) Foreign Application Priority Data
Dec. 18, 2008   (JP) .................................. 2008-322587

(51) Int. Cl.
*G02F 1/1335*   (2006.01)
*G02F 1/1343*   (2006.01)
*G02F 1/1333*   (2006.01)

(52) U.S. Cl.
CPC .... *G02F 1/133555* (2013.01); *G02F 1/133371* (2013.01)
USPC ............................. 349/114; 349/113; 349/144

(58) Field of Classification Search
CPC ................... G02F 1/133553; G02F 1/133555; G02F 1/136227; G02F 1/133371; G02F 1/133514; G02F 1/133707; G02F 1/134336; G02F 2001/134345
USPC .......................................... 349/114, 113, 144
See application file for complete search history.

(56) References Cited

U.S. PATENT DOCUMENTS

| | | | | |
|---|---|---|---|---|
| 6,665,041 B2 * | 12/2003 | Liao et al. | ..................... | 349/160 |
| 7,675,589 B2 * | 3/2010 | Kurasawa | ..................... | 349/106 |
| 7,697,099 B2 * | 4/2010 | Kume et al. | ................... | 349/138 |

(Continued)

FOREIGN PATENT DOCUMENTS

| | | |
|---|---|---|
| CN | 1614480 A | 5/2005 |
| JP | 2006-30951 | 2/2006 |

(Continued)

OTHER PUBLICATIONS

English Translation of Decision on Grant issued in Russian Application No. 2011129465/28 dated Jun. 28, 2012.

(Continued)

*Primary Examiner* — Mike Qi
(74) *Attorney, Agent, or Firm* — Nixon & Vanderhye, P.C.

(57) ABSTRACT

A liquid crystal display device includes: a first substrate and a second substrate opposed to each other; and a liquid crystal layer placed between the first and second substrates. The device has a plurality of pixels each having a transmission region configured to transmit light coming from the first substrate side and a reflection region configured to reflect light coming from the second substrate side at the first substrate. A transparent layer is provided in the reflection region for rendering the liquid crystal layer thinner in the reflection region than in the transmission region. A groove is formed between the pixels on the surface of the first substrate facing the liquid crystal layer.

4 Claims, 8 Drawing Sheets

(56) References Cited

U.S. PATENT DOCUMENTS

| | | |
|---|---|---|
| 7,714,962 B2 | 5/2010 | Arai et al. |
| 2005/0117108 A1 | 6/2005 | Kume et al. |
| 2005/0275776 A1 | 12/2005 | Ohue et al. |
| 2007/0064193 A1 | 3/2007 | Kurasawa |
| 2007/0076146 A1* | 4/2007 | Harada et al. ............... 349/114 |
| 2007/0121037 A1 | 5/2007 | Arai et al. |

FOREIGN PATENT DOCUMENTS

| | | |
|---|---|---|
| JP | 2007-003843 | 1/2007 |
| JP | 2007-94259 | 4/2007 |
| JP | 2007-148123 | 6/2007 |
| JP | 2007-264380 | 10/2007 |
| JP | 2007264380 A * | 10/2007 |
| KR | 2008-0003103 | 1/2008 |

OTHER PUBLICATIONS

International Search Report for PCT/JP2009/003124, filed Aug. 4, 2009.

* cited by examiner

_US 8,804,077 B2_

LIQUID CRYSTAL DISPLAY DEVICE

This application is the U.S. national phase of International Application No. PCT/JP2009/003124, filed Jul 6, 2009, which designated the U.S. and claims priority to Japan Application No. 2008-322587, filed Dec. 18, 2008, the entire contents of each of which are hereby incorporated by reference.

TECHNICAL FIELD

The present disclosure relates to liquid crystal display (LCD) devices.

BACKGROUND ART

In a transflective LCD device, a plurality of pixels each having a transmission region and a reflection region are arranged in a matrix, so that image display is performed using light from a backlight unit transmitted by the transmission region and external light reflected by the reflection region. In such a transflective LCD device, a transparent layer is provided in the reflection region to make the optical path length in the reflection region equal to that in the transmission region (see Patent Document 1, for example).

CITATION LIST

Patent Document

Patent Document 1: Japanese Patent Publication No. P2006-30951

SUMMARY OF THE INVENTION

Technical Problem

A pair of substrates constituting an LCD device are comparatively thinned for reducing the weight and thickness of the device, and thus easily bend. Therefore, when a load is locally applied to the LCD device due to an external impact, etc., the substrates may bend at the load-applied portion, causing a liquid crystal material of the liquid crystal layer to be pushed out of the portion and flow outside.

In the transflective LCD device described above, in which the liquid crystal layer is thinned with the transparent layers formed in the reflection regions, the liquid crystal material finds difficulty in flowing in the reflection regions. Therefore, when a load is locally applied and a volume of the liquid crystal material flows outside, such a volume of the liquid crystal material will find difficulty in returning to the load-applied portion immediately via the reflection regions. As a result, a bubble tends to be generated in the load-applied portion of the liquid crystal layer, and this tends to degrade the display quality.

In view of the problem described above, it is an objective of the present disclosure to suppress or reduce generation of a bubble in the liquid crystal layer at a time when a load is applied.

Solution to the Problem

To attain the above objective, according to the present disclosure, a groove is formed between pixels on the surface of a substrate constituting an LCD device facing a liquid crystal layer.

More specifically, the LCD device of the present disclosure includes: a first substrate and a second substrate opposed to each other; and a liquid crystal layer placed between the first substrate and the second substrate, wherein the device has a plurality of pixels each having a transmission region configured to transmit light coming from the first substrate side and a reflection region configured to reflect light coming from the second substrate side at the first substrate, a transparent layer is provided in the reflection region for rendering the liquid crystal layer thinner in the reflection region than in the transmission region, and a groove is formed between the pixels on the surface of the first substrate facing the liquid crystal layer.

With the above configuration, in which a groove is formed between the pixels on the surface of the first substrate facing the liquid crystal layer, flow of a liquid crystal material becomes easy in the grooved portions. Therefore, when a load is locally applied to the LCD device due to an external impact, etc. and a volume of the liquid crystal material flows out of the load-applied portion, such a volume of the liquid crystal material will easily return to the load-applied portion. Moreover, since the amount of the liquid crystal material can be increased by the portion of the groove formed, the percentage of the amount of the liquid crystal material with respect to its proper amount can be prevented from decreasing, and this can make it difficult to generate a bubble in the liquid crystal layer when a load is applied. Thus, as the whole, generation of a bubble in the liquid crystal layer at a time when a load is applied can be suppressed or reduced.

The plurality of pixels may be arranged in a matrix, and the transparent layer may be formed integrally for each row of pixels.

With the above configuration, in which the transparent layer is formed integrally for each row of pixels, among the plurality of pixels arranged in a matrix, the transparent layer is also formed between the adjacent pixels in each row. If no groove is formed on the first substrate unlike the LCD device according to the present disclosure, the liquid crystal layer will be comparatively thin also in the portions between the adjacent pixels in each row. Therefore, when a load is locally applied and a volume of the liquid crystal material flows out of the load-applied portion, it will be considerably difficult for such a volume of the liquid crystal material to return to the load-applied portion, causing the possibility of generating a bubble in the liquid crystal layer. In such a case, therefore, the advantage of the present disclosure is especially effective.

Preferably, the groove is formed in a lattice shape between the pixels.

With the above configuration, flow of the liquid crystal material becomes easy in the entire portions between the pixels. Also, since the amount of the liquid crystal material constituting the liquid crystal layer is increased as much as possible, the percentage of the amount of the liquid crystal material with respect to its proper amount is prevented from decreasing. Therefore, generation of a bubble in the liquid crystal layer at a time when a load is applied is advantageously suppressed or reduced.

Preferably, the first substrate includes a plurality of interconnects placed to extend between the pixels and an insulating film formed to cover the interconnects, and an alignment film is formed on the insulating film, the groove is formed on the insulating film, and a relationship of $T1 < D \leq 0.9 \times (D+T2)$ is satisfied where $T1$ is a thickness of the alignment film, $T2$ is a thickness of portions of the insulating film lying on the interconnects, and $D$ is a depth of the groove.

If the relationship of $T1 \geq D$ is satisfied, the groove will be filled with the alignment film, making it difficult to sufficiently suppress or reduce generation of a bubble in the liquid crystal layer at a time when a load is applied. If the relationship of $D > 0.9 \times (D+T2)$ is satisfied, which indicates that the portions of the insulating film lying on the interconnects will be comparatively thin, cracking will easily occur in the portions of the insulating film when a load is applied, and thus the display quality will be easily degraded due to the cracking. Conversely, when the relationship of T1<D<0.9×(D+T2) is satisfied as in the above configuration, generation of a bubble in the liquid crystal layer at a time when a load is applied is sufficiently suppressed or reduced, and also generation of cracking in the insulating film is suppressed or reduced. Thus, the display quality can be advantageously improved.

Advantages of the Invention

According to the present disclosure, in which a groove is formed between the pixels on the surface of a substrate constituting the LCD device facing the liquid crystal layer, it is possible to suppress or reduce generation of a bubble in the liquid crystal layer at a time when a load is applied. As a result, the display quality can be improved.

DESCRIPTION OF EMBODIMENTS

Embodiments of the present disclosure will be described hereinafter with reference to the drawings. It should be noted that the present disclosure is not limited to the embodiments to follow.

(First Embodiment)

Figure 1:
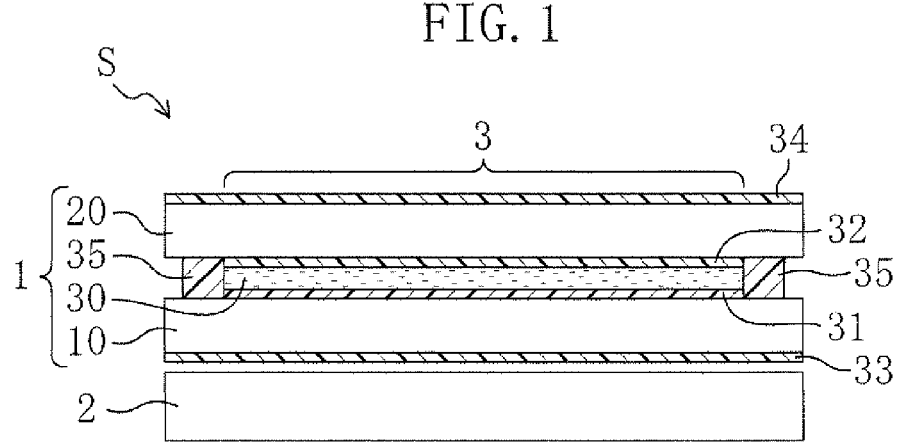
FIG. 1 is a cross-sectional view schematically showing an LCD device of the first embodiment.
Figure 2:
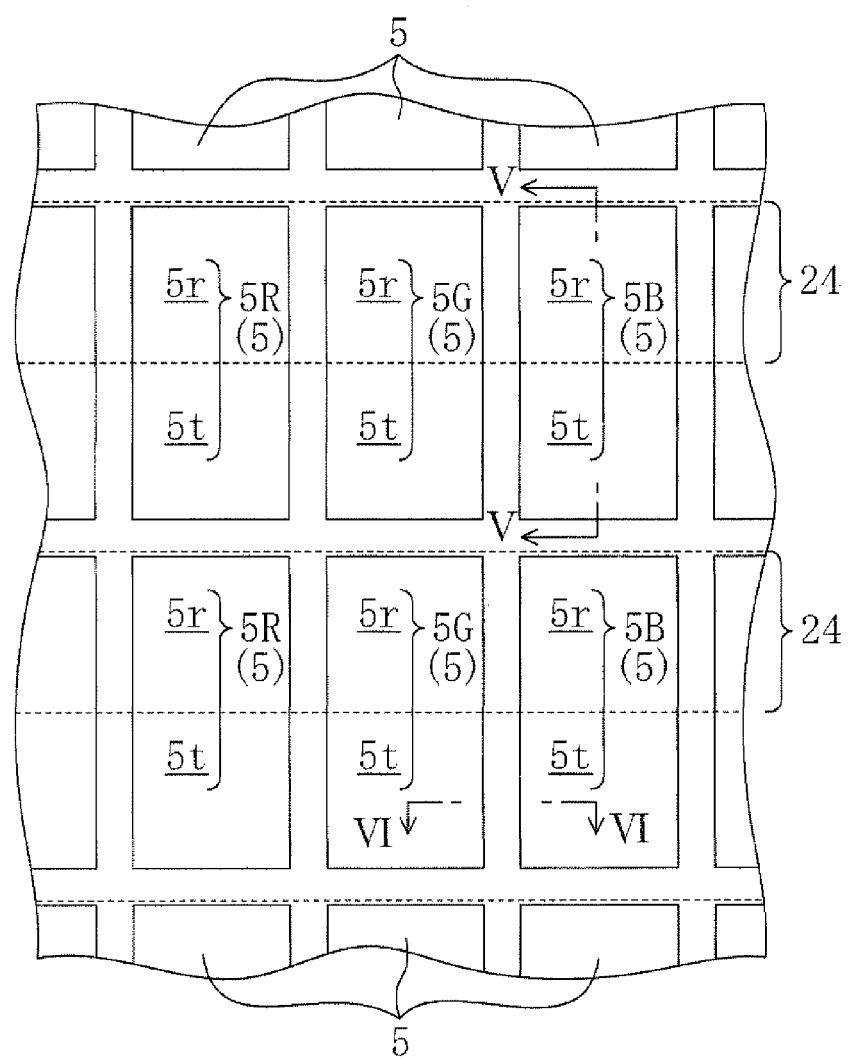
FIG. 2 is a plan view schematically showing part of an LCD panel.
Figure 3:
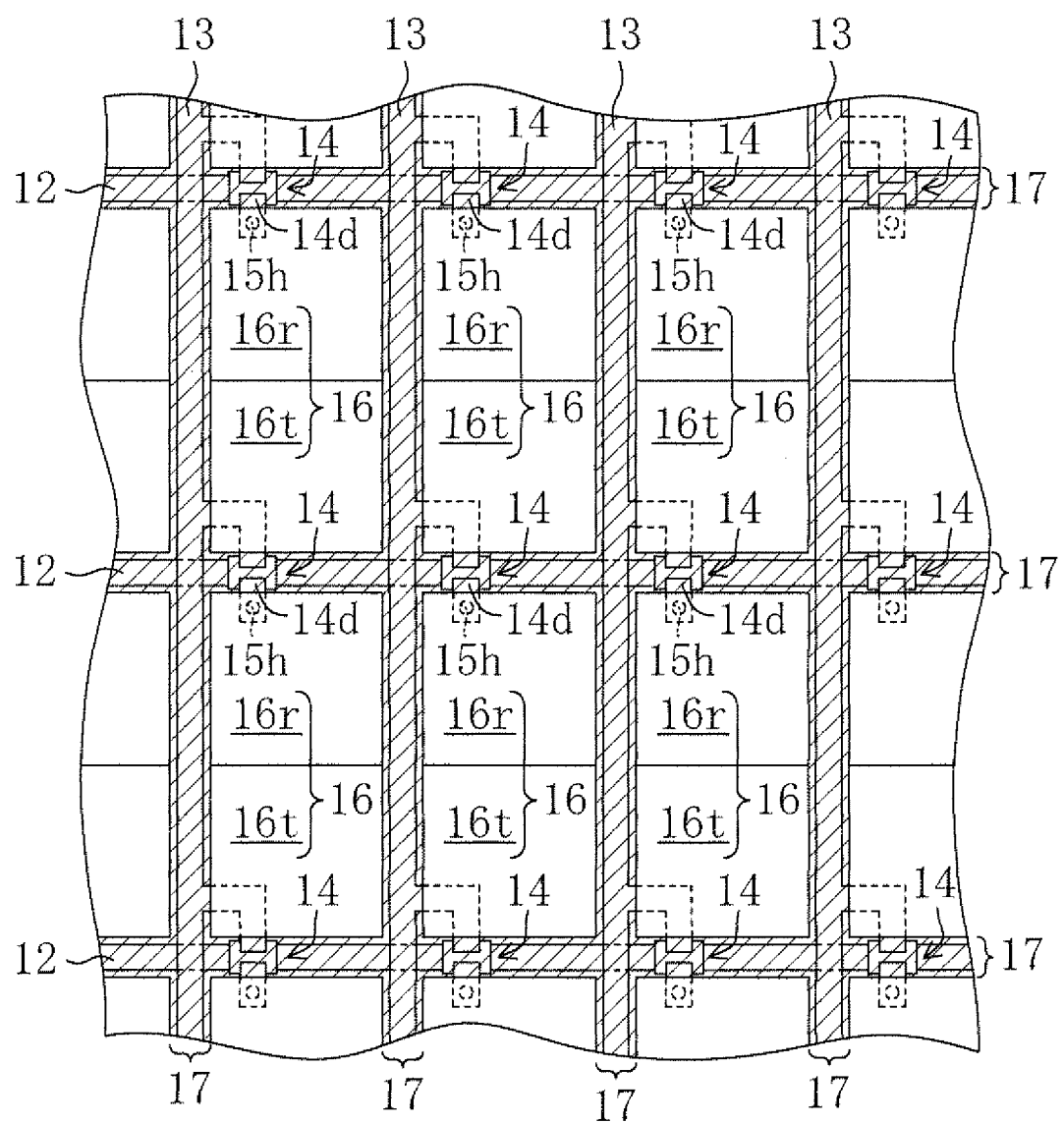
FIG. 3 is a plan view schematically showing part of an active matrix substrate.
Figure 4:
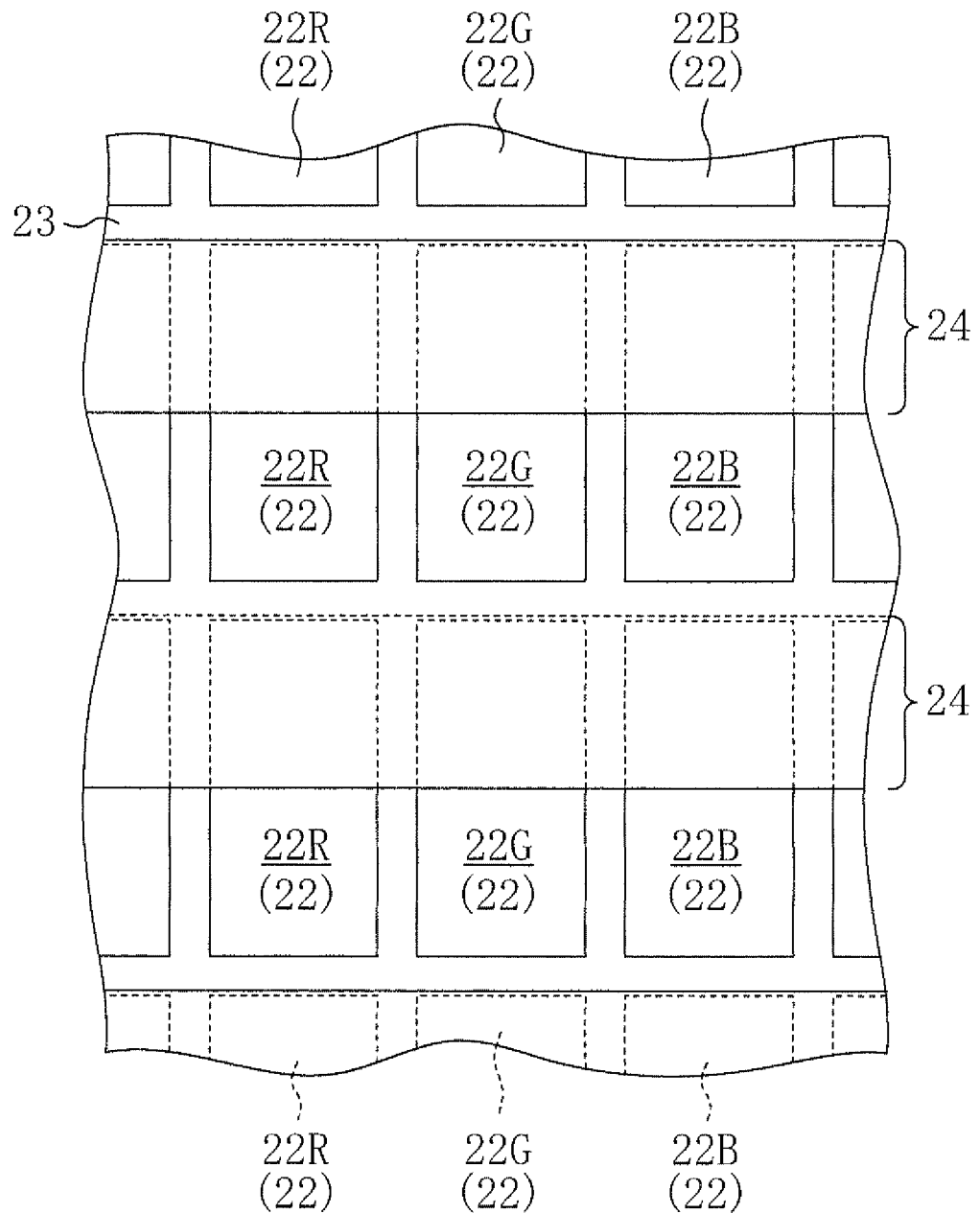
FIG. 4 is a plan view schematically showing part of a color filter substrate.
Figure 5:
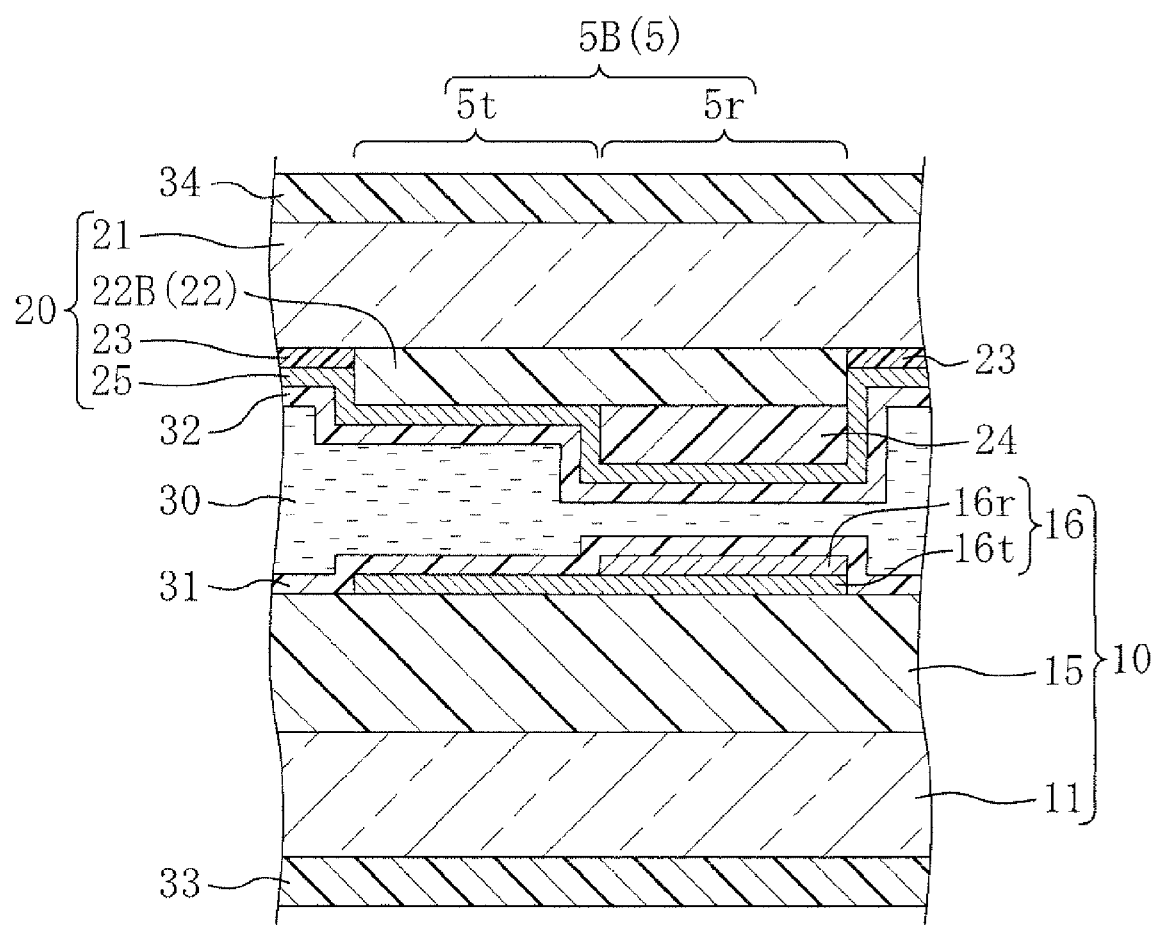
FIG. 5 is a schematic cross-sectional view taken along line V-V in FIG. 2.
Figure 6:
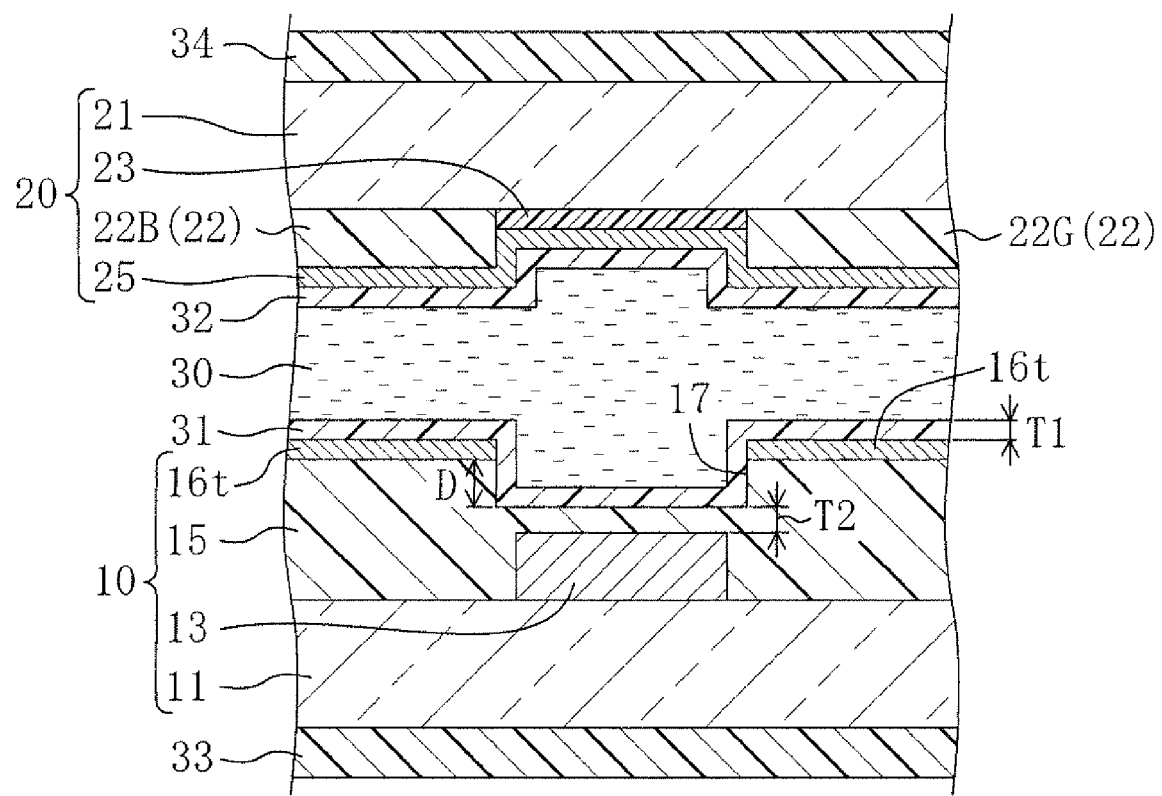
FIG. 6 is a schematic cross-sectional view taken along line VI-VI in FIG. 2.

FIGS. 1 to 7 show the first embodiment of the present invention. FIG. 1 is a cross-sectional view schematically showing an LCD device S. FIG. 2 is a plan view schematically showing part of an LCD panel 1. FIG. 3 is a plan view schematically showing part of an active matrix substrate 10, and FIG. 4 is a plan view schematically showing part of a color filter substrate 20. FIG. 5 is a schematic cross-sectional view of part of the LCD panel 1 taken along line V-V in FIG. 2, and FIG. 6 is a schematic cross-sectional view of part of the LCD panel 1 taken along line VI-VI in FIG. 2. Note that FIGS. 3 and 4 show the part corresponding with the part shown in FIG. 2, and that illustration of a common electrode 25 is omitted in FIG. 4.

As shown in FIG. 1, the LCD device S includes an LCD panel 1 and a backlight unit 2 placed on the back side (lower side as viewed from FIG. 1) of the LCD panel 1.

The LCD panel 1 includes: an active matrix substrate 10 as a first substrate placed on the side closer to the backlight unit 2; a color filter substrate 20 as a second substrate opposed to the active matrix substrate 10; and a liquid crystal layer 30 placed between the substrates 10 and 20. A portion of the LCD panel 1 where the substrates 10 and 20 are opposed via the liquid crystal layer 30 constitutes a display portion 3 for displaying an image.

The active matrix substrate 10 and the color filter substrate 20, formed in a rectangular shape, for example, have alignment films 31 and 32 respectively formed on the surfaces facing the liquid crystal layer 30 and polarizing plates 33 and 34 respectively formed on the surfaces away from the liquid crystal layer 30, A frame-shaped sealing member 35 made of epoxy resin, etc. is formed between the active matrix substrate 10 and the color filter substrate 20 to surround the display portion 3, and a liquid crystal material is sealed inside the frame-shaped sealing member 35, thereby to form the liquid crystal layer 30.

The display portion 3 is comprised of a plurality of pixels 5 arranged in a matrix as shown in FIG. 2. The plurality of pixels 5 include pixels of a plurality of colors, such as red, green, and blue pixels 5R, 5G, and 5B, for example, and such pixels 5R, 5G, and 5B are arranged cyclically in the row direction. Each of the pixels 5 has a transmission region 5t that transmits light from the backlight unit 2 and a reflection region 5r that reflects external light coming from the color filter substrate 10 side at the active matrix substrate 10. The transmission region 5t occupies the lower part of each pixel 5 in the column direction, and the reflection region 5r occupies the upper part of each pixel 5 in the column direction, for example.

The active matrix substrate 10 includes a glass plate 11 as shown in FIGS. 5 and 6. On the glass plate 11, as shown in FIG. 3, a plurality of gate lines 12 extend in parallel with each other between the adjacent pixels 5 in the row direction (horizontal direction as viewed from FIG. 3), and a plurality of source lines 13 extend in parallel with each other between the adjacent pixels 5 in the column direction (vertical direction as viewed from FIG. 3). Thin film transistors (TFTs) 14 are formed near the intersections between the gate lines 12 and the source lines 13, to be connected to the corresponding gate and source lines 12 and 13.

The active matrix substrate 10 also includes an insulating film 15 made of acrylic resin as shown in FIGS. 5 and 6, formed to cover the source lines 13 and the TFTs 14. As shown in FIG. 3, contact holes 15h are formed through the insulating film 15 at positions above drain electrodes 14d of the TFTs 14. Pixel electrodes 16 are provided for the individual pixels 5 to be connected to the corresponding TFTs 14 via the corresponding contact holes 15. An alignment film 31 is formed on the insulating film 15 to cover the pixel electrodes 16 as shown in FIGS. 5 and 6.

As shown in FIGS. 3 and 5, each of the pixel electrodes 16 includes a transparent electrode 16t formed in the entire region of each pixel 5 and a reflection electrode 16r formed on the portion of the transparent electrode 16t in the reflection region 5r of the pixel 5. The transparent electrode 16t is made of indium tin oxide (ITO), etc., and the reflection electrode 16r is comprised of a Ti layer and an Al layer sequentially stacked one upon the other, for example, to suppress or reduce galvanic corrosion with the transparent electrode 16t.

As shown in FIGS. 3 and 6, a groove 17 is formed on the surface of the insulating film 15 of the active matrix substrate 10 facing the liquid crystal layer 30 to extend between the pixel electrodes 16. The groove 17 in this embodiment extends between the pixel electrodes 16 in a lattice shape as shown by the hatched portion in FIG. 3.

Assume that the thickness of the alignment film 31 is T1, the thickness of the portions of the insulating film 15 lying on the source lines 13 is T2, and the depth of the groove 17 is D. If the relationship of T1≥D is satisfied, the groove 17 will be filled with the alignment film 31, making it difficult to sufficiently suppress or reduce generation of a bubble in the liquid crystal layer 30 at a time when a load is applied. Also, if D>0.9×(D+T2) is satisfied, which indicates that the portions of the insulating film 15 lying on the source lines 13 are comparatively thin, cracking will easily occur in the portions of the insulating film 15 when a load is applied, and thus the display quality will be easily degraded due to the cracking. Therefore, the groove 17 is formed to satisfy the relationship of T1<D≤0.9×(D+T2).

The color filter substrate 20 includes a glass plate 21 as shown in FIGS. 5 and 6. On the glass plate 21, as shown in FIG. 4, a plurality of color filters 22 having colors corresponding to the colors of the pixels 5, i.e., red, green, and blue color filters 22R, 22G, and 22B, are formed to coincide with the corresponding pixel electrodes 16. A black matrix 23 is provided to separate the color filters 22 from one another.

The color filter substrate 20 also includes transparent layers 24 formed in the reflection regions 5r of the pixels 5 for rendering the liquid crystal layer 30 thinner in the reflection regions 5r than in the transmission regions 5t. In this way, the thickness of the liquid crystal layer 30 in the reflection regions 5r is reduced to about a half of that in the transmission regions 5t, so that the light path length of light passing through the liquid crystal layer 30 in the reflection regions 5r is made approximately equal to that in the transmission regions 5t, thereby to enhance the display quality. The transparent layers 24 are formed integrally for each row of pixels 5, extending over the reflection regions 5r of each row. The color filter substrate 20 further includes the common electrode 25 to cover the transparent layers 24 and the color filters 22 as shown in FIGS. 5 and 6.

The backlight unit 2 has a light source such as a light emitting diode (LED), a light guide plate, and a plurality of optical sheets such as prism sheets, although illustration of these elements is omitted, and is configured so that light emitted from the light source to the light guide plate is output from the output surface of the light guide plate toward the LCD panel 1 via the optical sheets as uniform planar light.

As described above, in the transflective LCD device S, while light from the backlight unit 2 is transmitted in the transmission region St and external light is reflected in the reflection region Sr in each pixel 5, a voltage is applied between the pixel electrode 16 and the common electrode 25 to control the alignment of liquid crystal molecules for each pixel 5, thereby to perform desired image display in the display portion 3.

—Fabrication method—

A method for fabricating the LCD device S will be described.

First, the two glass plates 11 and 21 are prepared. On one glass plate 11, formed are the gate lines 12, the source lines 13, the TFTs 14, the insulating film 15, the pixel electrodes 16, etc. Subsequently, the insulating film 15 is dry-etched using the pixel electrodes 16 as a mask, to form the groove 17 between the pixel electrodes 16, thereby to complete the active matrix substrate 10. The alignment film 31 is then formed on the surface of the active matrix substrate 10 by a printing method. On the other glass plate 21, formed are the black matrix 23, the color filters 22, the transparent layers 24, and the common electrode 25, to complete the color filter substrate 20. The alignment film 32 is then formed on the surface of the color filter substrate 20 by a printing method.

Thereafter, the sealing member 35 is placed in a frame shape on the active matrix substrate 10 with the alignment film 31 formed thereon, by a writing or printing method. A predetermined amount of the liquid crystal material is dropped into a region surrounded by the sealing member 35 on the active matrix substrate 10. Subsequently, in a vacuum treatment chamber, the active matrix substrate 10 and the color filter substrate 20 are aligned with each other so that the pixel electrodes 16 of the former and the color filters 22 of the latter coincide with each other, and then allowed to adhere to each other via the sealing member 35. The sealing member 35 is then cured to bond the two substrates 10 and 20 together. In this way, the LCD panel 1 is fabricated.

In this embodiment, the LCD panel 1 is fabricated using the "one drop fill" process as an example, in which the frame-shaped sealing member 35 is placed on the active matrix substrate 10, the liquid crystal material is dropped inside the framed sealing member 35, and then the active matrix substrate 10 and the color filter substrate 20 are bonded together. Alternatively, the LCD panel 1 may be fabricated by a "vacuum injection" process in which a sealing member is placed in a roughly frame shape having a cut, which is to serve as a filling hole, on the active matrix substrate 10, the active matrix substrate 10 and the color filter substrate 20 are bonded together via the sealing member, a liquid crystal material is injected under vacuum into the space between the two substrates 10 and 20 via the filling hole, and then the filling hole is sealed.

Thereafter, the polarizing plates 33 and 34 are bonded to the opposite surfaces of the LCD panel 1. The previously-fabricated backlight unit 2 is then placed on the back surface side of the LCD panel 1, thereby to complete the LCD device S shown in FIG. 1.

—Example of Evaluation Test—

An impact test carried out as an evaluation test will be described.

As the percentage of the amount of the liquid crystal material sealed in the LCD panel with respect to its proper amount is smaller, a bubble is more likely to be generated when the LCD panel undergoes an impact. In the impact test, therefore, a plurality of samples of the LCD panel 1 different in the amount of the liquid crystal material are produced, and an impact is exerted on a center portion of each sample of the LCD panel 1, to examine generation of a bubble in the liquid crystal layer 30 of the LCD panel 1. More specifically, samples of the LCD panel 1 in which the amounts of the liquid crystal material are 97%, 98%, 99%, and 100% of its proper amount are produced, and the impact test is carried out for these samples. The impact-exerted samples of the LCD panel 1 are then subjected to visual inspection and a display test by lighting, to examine whether or not a bubble has been generated in the liquid crystal layer 30.

The impact test described above is carried out for samples of the LCD panel 1 that have a thickness T1 of the alignment film 31 of 100 nm, a thickness T2 of the portions of the insulating film 15 lying on the source lines 13 of 1.5 μm, and a depth D of the groove 17 of 1.0 μm and satisfy the relationship of T1<D≤0.5×(D+T2) as Example 1, and for samples of the LCD panel 1 that have a thickness T1 of the alignment film 31 of 100 nm, a thickness T2 of the portions of the insulating film 15 lying on the source lines 13 of 1.0 μm, and a depth D of the groove 17 of 1.5 μm and satisfy the relationship of 0.5×(D+T2)<D≤0.9×(D+T2) as Example 2. As a comparative example, the impact test is also carried out for samples of an LCD panel that have a thickness T1 of the alignment film of 100 μn and a thickness T2 of the portions of the insulating film lying on the source lines of 2.5 μm and do not have the groove 17. In these LCD panels of Examples 1 and 2 and the comparative example, the thickness of the liquid crystal layer in the transmission regions is 4 µm, and the thickness of the liquid crystal layer in the reflection regions is 2 µm.

Figure 7:
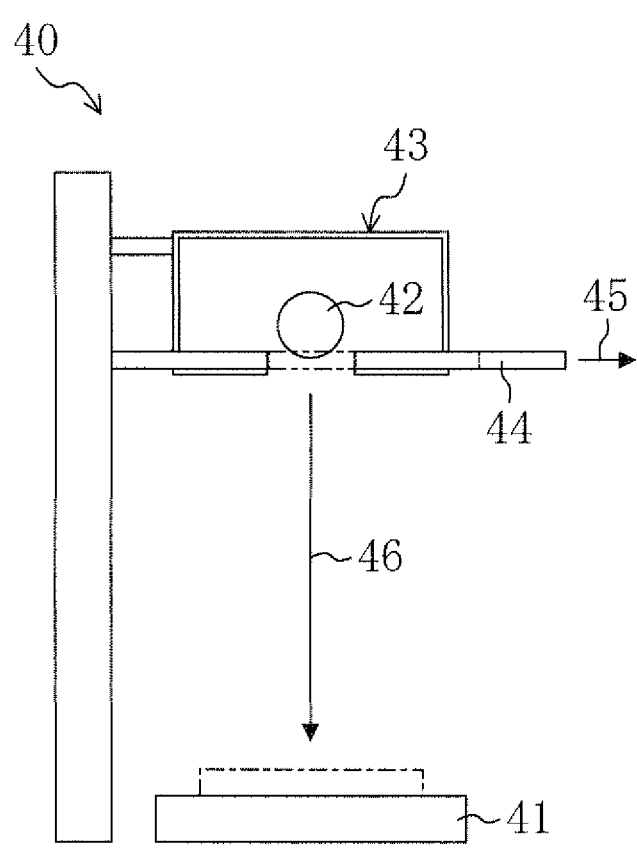
FIG. 7 is a cross-sectional view schematically showing an impact test apparatus used in an impact test.

The impact test is carried out using an impact test apparatus 40 shown in FIG. 7. As shown in FIG. 7, the impact test apparatus 40 includes: a stage 41 on which an LCD panel to be tested (shown by the one-dot dashed line in FIG. 7) is to be rested; and a steel ball box 43 placed above the stage 41, in which a steel box 42 having a diameter of 1 cm is housed. The steel ball box 43 has an outwardly-protruding bottom plate 44, and by pulling the bottom plate 44 to allow the plate 44 to slide outward, a bottom portion of the box 43 is open, causing the steel ball 42 to fall to the LCD panel rested on the stage 41. In FIG. 7, an arrow 45 indicates the direction in which the bottom plate 44 slides, the two-dot dashed line indicates the position of the bottom plate 44 before it slides, and an arrow 46 indicates the direction in which the steel ball 42 falls. In this impact test, the steel ball 42 is allowed to fall from the steel ball box 43 to the LCD panel to be tested on the stage 41 by a distance of 30 cm, to exert an impact.

The test results are shown in Table 1 below.

TABLE 1

| | LD material amount with respect to proper amount | | | |
|---|---|---|---|---|
| | 97% | 98% | 99% | 100% |
| Comparative example | x | x | x | ○ |
| Example 1  T1 < D ≤ 0.5(D + T2) | x | x | ○ | ○ |
| Example 2  0.5(D + T2) < D ≤ 0.9(D + T2) | x | ○ | ○ | ○ |

In Table 1, "○" represents that no bubble has been observed and "x" represents that a bubble has been observed. As is found from Table 1, a bubble has been observed in the LCD panel of the comparative example when the amount of the liquid crystal material is 99% or less of its proper amount. Conversely, a bubble has been observed in the LCD panel 1 of Example 1 when the amount of the liquid crystal material is 98% or less of its proper amount, and a bubble has been observed in the LCD panel of Example 2 when the amount of the liquid crystal material is 97% or less of its proper amount. From these results, it has been found that, by forming the groove 17 between the pixels 5 on the surface of the active matrix substrate 10 facing the liquid crystal layer 30, an advantageous effect can be produced in which generation of a bubble in the liquid crystal layer 30 at a time when a load is applied can be suppressed or reduced.

—Advantage of First Embodiment—

According to the first embodiment, with the groove 17 formed in a lattice shape between the pixels 5 on the surface of the active matrix substrate 10 facing the liquid crystal layer 30, flow of the liquid crystal material becomes easy in the entire portions between the pixels 5. Therefore, when a load is locally applied to the LCD device S due to an external impact, etc. and a volume of the liquid crystal material flows out of the load-applied portion, such a volume of the liquid crystal material will easily return to the load-applied portion. Also, since the amount of the liquid crystal material can be increased by the portion of the groove 17 formed, the percentage of the amount of the liquid crystal material with respect to its proper amount can be prevented from decreasing, and this can make it difficult to generate a bubble in the liquid crystal layer 30 when a load is applied. From the above reasons, as the whole, generation of a bubble in the liquid crystal layer 30 at a time when a load is applied can be suppressed or reduced.

Moreover, since the relationship of T1<D≤0.9<(D+T2) is satisfied where T1 is the thickness of the alignment film 31, T2 is the thickness of the portions of the insulating film 15 lying on the source lines 13, and D is the depth of the groove 17, generation of a bubble in the liquid crystal layer 30 at a time when a load is applied can be sufficiently suppressed or reduced, and also generation of cracking in the insulating film 15 can be suppressed or reduced. As a result, the display quality can be advantageously improved.

(Second Embodiment)

Figure 8:
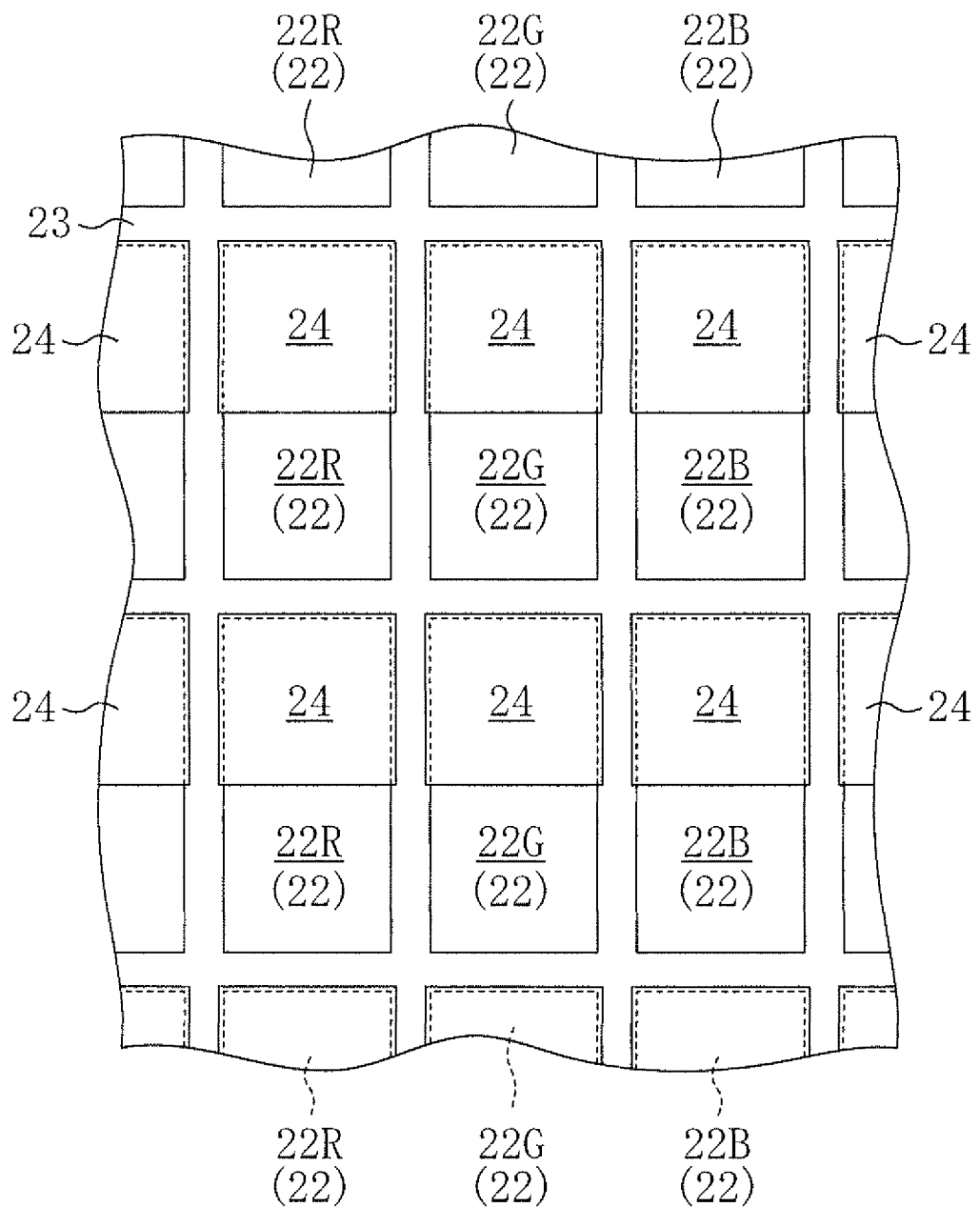
FIG. 8 is a plan view schematically showing part of a color filter substrate of an LCD device of the second embodiment.

FIG. 8 shows the second embodiment of the present disclosure. Note that in this and the subsequent embodiments, the same components as those in FIGS. 1 to 7 are denoted by the same reference characters, and the detailed description thereof is omitted. FIG. 8 is a plan view schematically showing part of the color filter substrate 20 constituting the LCD device S of this embodiment.

In the first embodiment described above, the transparent layers 24 are formed integrally for each line of pixels 5. In this embodiment, the transparent layers 24 are formed individually for the reflection regions 5r of the pixels 5 as shown in FIG. 8. Like the first embodiment described above, the groove 17 is formed in a lattice shape between the pixel electrodes 16 on the surface of the active matrix substrate 10 facing the liquid crystal layer 30. The other configuration of the LCD device S of this embodiment is also similar to that in the first embodiment.

—Advantage of Second Embodiment—

According to the second embodiment, also, with the groove 17 formed in a lattice shape between the pixels 5 on the surface of the active matrix substrate 10 facing the liquid crystal layer 30, a similar advantage to that described in the first embodiment can be obtained.

(Other Embodiment)

Figure 9:
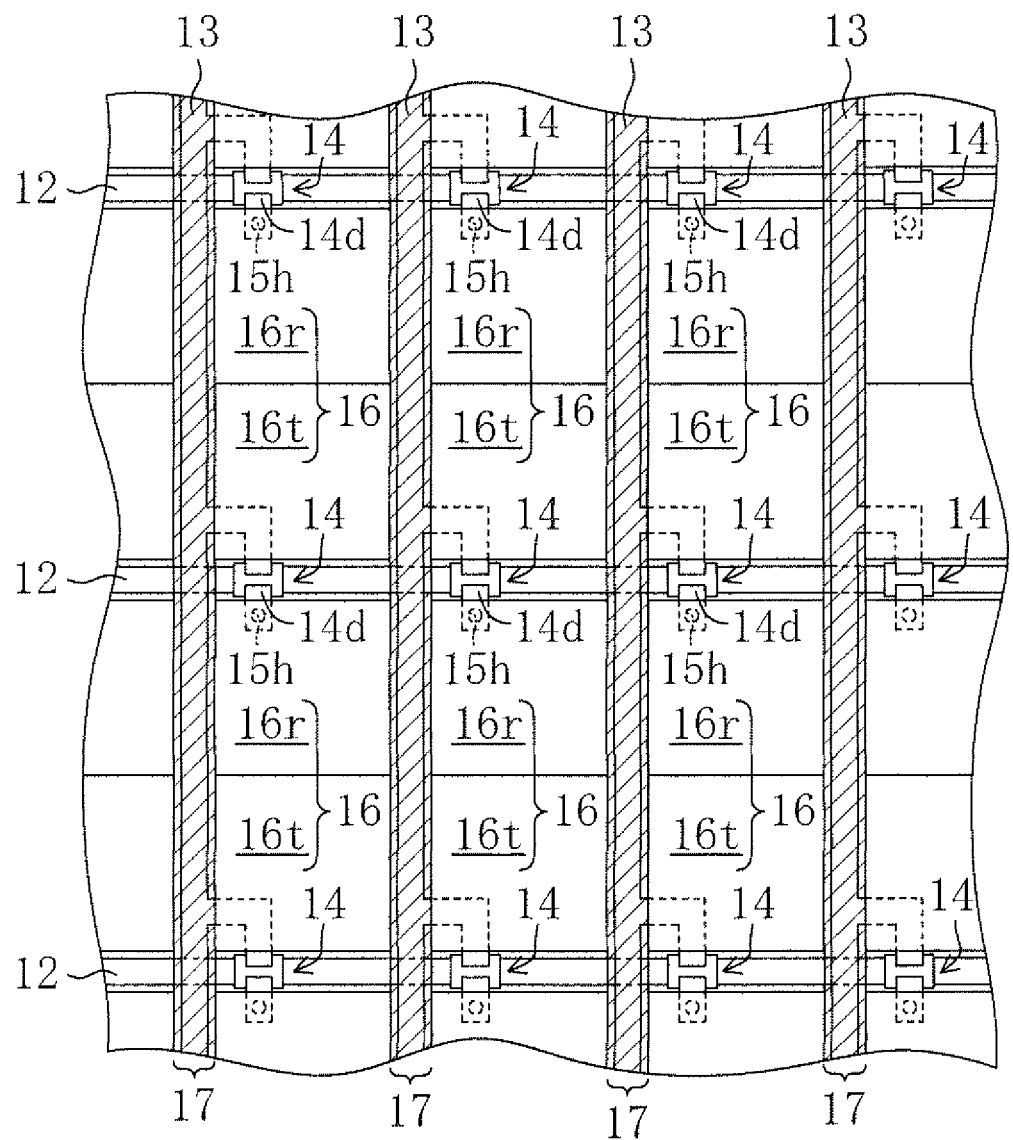
FIG. 9 is a plan view schematically showing part of an active matrix substrate of another embodiment.

Although the groove 17 is formed in a lattice shape between the pixel electrodes 16 in the first and second embodiments, the present disclosure is not limited to this, but the groove 17 may be formed in at least part of the portions between the pixels 5. For example, as indicated by the hatched portions in FIG. 9, a plurality of grooves 17 may be formed to extend between the pixels 5 in the column direction (vertical direction as viewed from FIG. 9). Having the groove 17 formed in at least part of the portions between the pixels 5, when a load is locally applied to the LCD device S and a volume of the liquid crystal material flows out of the load-applied portion, such a volume of the liquid crystal material will easily return to the load-applied portion. Also, the amount of the liquid crystal material can be increased by the portion of the groove 17 formed. Thus, generation of a bubble in the liquid crystal layer 30 at a time when a load is applied can be suppressed or reduced.

INDUSTRIAL APPLICABILITY

As described above, the present disclosure is useful in LCD devices, and in particular, suitable for transflective LCD devices for which it is required to suppress or reduce generation of a bubble in the liquid crystal layer at a time when a load is applied.

| DESCRIPTION OF REFERENCE CHARACTERS | |
|---|---|
| D | Depth of Groove |
| S | LCD Device |
| T1 | Thickness of Alignment Film |
| T2 | Thickness of Insulating Film on Source Line (Thickness of Insulating Film on Interconnect) |
| 5 | Pixel |

-continued

DESCRIPTION OF REFERENCE CHARACTERS

| | |
|---|---|
| 5t | Transmission Region |
| 5r | Reflection Region |
| 10 | Active Matrix Substrate (First Substrate) |
| 12 | Gate Line |
| 13 | Source Line |
| 15 | Insulating Film |
| 17 | Groove |
| 20 | Color Filter Substrate (Second Substrate) |
| 24 | Transparent Layer |
| 30 | Liquid Crystal Layer |
| 31, 32 | Alignment Film |

The invention claimed is:

1. A liquid crystal display device, comprising:

a first substrate and a second substrate opposed to each other; and a liquid crystal layer placed between the first substrate and the second substrate, wherein the device has a plurality of pixels each having a transmission region configured to transmit light coming from the first substrate side and a reflection region configured to reflect light coming from the second substrate side at the first substrate, a transparent layer is provided in the reflection region for rendering the liquid crystal layer thinner in the reflection region than in the transmission region, and a groove is formed between the pixels on the surface of the first substrate facing the liquid crystal layer.

2. The liquid crystal display device of claim 1, wherein the plurality of pixels are arranged in a matrix, and the transparent layer is formed integrally for each row of pixels.

3. The liquid crystal display device of claim 1, wherein the groove is formed in a lattice shape between the pixels.

4. The liquid crystal display device of claim 1, wherein the first substrate includes a plurality of interconnects placed to extend between the pixels and an insulating film formed to cover the interconnects, and an alignment film is formed on the insulating film, the groove is formed on the insulating film, and a relationship of $T1 < D \leq 0.9 \times (D+T2)$ is satisfied where $T1$ is a thickness of the alignment film, $T2$ is a thickness of portions of the insulating film lying on the interconnects, and $D$ is a depth of the groove.

* * * * *